PROCESS FOR CONTINUOUSLY OPERATING CHROMATING SOLUTIONS

Werner Rausch, Frankfurt am Main, Germany, assignor to Parker Rust Proof Company, Detroit, Mich., a corporation of Michigan
No Drawing. Filed Nov. 26, 1958, Ser. No. 776,443
Claims priority, application Germany Nov. 28, 1957
4 Claims. (Cl. 148—6.2)

This invention relates to improvements in the continuous operation of chromating processes and more particularly relates to improvements in the continuous operation of chromating solutions to form protective coatings on metals such as zinc, aluminum, magnesium, cadmium, copper, iron, brass, bronze and the like.

Chromating solutions, suitable for forming protective coatings on metallic surfaces, contain as the principal ingredient hexavalent chromium and have been modified to include a number of other ions to modify the rate of coating formation or the properties in the resulting coating, such for example as fluoride ion, complex fluoride ions, chloride ions, sulfate ions, nitrate ions, formate ions, ferricyanide ions, etc. During the operation of such an aqueous hexavalent chromium solution the hexavalent chromium is reduced to trivalent chromium and the trivalent chromium tends to build up in concentration in the bath. Additionally the metallic ions from the surface being coated increase in concentration in the bath and as the result of these increases the bath becomes less acid, or the pH value of the bath increases with continued use. Decreases in acidity, or increases in pH, reduce the rate of metal coating formation and are undesirable, and for continuous operation it has been conventional to maintain the desired pH condition by the addition of acid. For continuous operation such solutions have been replenished by the addition of hexavalent chromium compounds, desired modifying or activating ions and the pH has been maintained at the desired value by periodic additions of acid. With this type of operation the concentration of trivalent chromium and other undesirable metallic ions in the solution continue to build up so that even though the pH is maintained, the hexavalent ion concentration and the activator ion concentrations are preserved, the coating-forming ability of the solution nevertheless gradully diminishes.

In an attempt to overcome these disadvantages it has been proposed to remove the undesirable cations by the use of ion exchange resins. The ion exchange resins are of the type which are capable of removing the undesirable cations, namely the strongly acidic cation exchange resins. Such resins remove all metallic cations from the chromating solution including trivalent chromium, the metallic ion dissolved from the surface being coated such as zinc, aluminum, ion, magnesium, copper, etc. and alkali metal ions and replaces these ions with the hydrogen ion from the ion exchange resin. The effluent which is returned from the ion exchange resin bed to the operating chromating solution is therefore more acid than the operating chromating solution.

In accordance with this invention it has been found that continuous operation of chromating solutions employing strongly acidic cation exchange resin beds for the removal of the undesirable metallic cation introduces an undesirable quantity of the hydrogen ion into the operating solution upon continued use. The proportion of hydrogen ion thus introduced into the operating chromating solution ultimately raises the acidity of the operating solution to a point such that the resulting chromate coatings exhibit decreased effectiveness in protecting the metal surface against corrosion, or in serving as a base for paint or other overlayer such as a plastic film or the like. In accordance with this invention it has been found that the undesirable metallic cations can be continuously removed from an aqueous hexavalent chromium-containing solution, on a continuous basis, by the step of preliminarily conditioning the strongly acidic cation exchange resin so that the effluent from the resin bed has substantially the same pH as that possessed by the solution fed into the ion exchange resin bed. It has been further found that an aqueous hexavalent chromium-containing solution is not rendered less efficient in its metal coating-forming ability by the presence therein of the alkali metal ions, including the ammonium ion.

The preliminary conditioning of the strongly acidic cation exchange resin bed of this invention is most easily accomplished by preliminarily passing a portion of the operating chromating solution, or a separate chromating solution of substantially equivalent acidity to that of the operating solution, through the resin bed and continuing the passage of such solution through the bed until the measured pH of the effluent is substantially the same as the pH of the feed solution. The resin bed is then in condition for treating portions of the operating chromating solution and the return of the effluent from such a bed does not appreciably change the acidity of the operating chromating solution and that solution maintains its effectiveness as a metal coating solution.

The ratio of hydrogen ions to the other cations in the effluent can be obtained by analysis of the effluent for such ions, and this ratio is a measure of the same ions in the resin bed itself. When the ion exchange resin bed becomes depleted the bed is regenerated by modifying the normally employed mineral acid regeneration treatment in the following manner. A proportion of an alkali metal ion is incorporated in the regenerating acid and this modified regenerating acidic solution is used to regenerate the bed. After regeneration the relative proportion of hydrogen and alkali metal ions in the regenerated resin bed is checked to insure that it corresponds to substantially the proportions of those ions which exist in the operating chromating solution. Based upon this analysis and any necessary alteration of the proportion of alkali metal ions in the regenerating acid solution to make the resulting ion exchange resin contain the desired proportion of hydrogen and alkali metal ions, a regenerating acidic solution is established. The use of this particular acidic regenerating solution will enable the regeneration of the spent resin bed without requiring the repetition of the treatment of that bed with a quantity of that operating solution to place it in the desired hydrogen ion-alkali metal ion balanced condition. It will thus be apparent that an operating chromating solution can be maintained free of the undesired cations using such a modified ion exchange resin bed without substantially modifying the acidity conditions in the operating chromating solution. Thus in order to keep a particular chromating solution in effective metal coating condition, it is necessary to determine only the ratio of hydrogen ions to alkali metal ions in the operating solution and the appropriate ratio of these same ions in the regenerating solution for the resin bed and thereafter the resin bed can be alternately employed to treat a portion of the operating chromating solution, on a continuous batch basis, and regenerated with the modified acidic regenerating solution.

For any particular chromating solution operation, the most effective resin bed for use therewith can be initially established in accordance with the above specified procedure of determining the ratio of hydrogen ions to other innocuous metallic cations, and additional resin beds can be formulated by admixing appropriate quantities of the hydrogen form of strongly acidic cation exchange resins and the sodium forms of such resins, if desired. As above indicated the chromating solutions of this invention may vary widely in their constituent materials and may contain any of the modifying or accelerating ions which are known to enhance the coating-forming ability of aqueous hexavalent chromium solutions. The hexavalent chromium ion may be introduced into the solution as chromic acid or as a dichromate. It is preferred to employ the chromic acid source since any metallic ion which is present in the chromate salt will be removed in the cation exchange resin treatment and this removal unnecessarily loads the ion exchange resin. It is therefore preferred to avoid the use of dichromate salts and particularly heavy metal dichromate salts although such salts can be used except for this particular disadvantage. For treating aluminum the presence of the fluoride ion is desirable and in such cases the fluoride ion may be introduced as hydrofluoric acid, fluoboric acid, fluosilicic acid, or the alkali metal salts thereof. The ferricyanide ion may be introduced in the form of the acid or as the alkali metal salt and for aluminum coating solutions a suitable proportion is between about 0.02% and about 0.2% by weight.

The cation exchange resins which have been found suitable for the purposes of this invention are generally designated the strongly acidic cation exchange resins such as styrene-divinyl benzene resins which have been sulfonated with sulfuric acid. Such resins are commercially available and one such resin which has been found to be satisfactory for the purposes of this invention is Dowex 50, which is available from the Dow Chemical Company. Other similar resins are available under the designations 1R–120 and Nalcite HGR. Such suitable resins are sulfonated styrene-divinyl benzene resins containing 1%–16% divinyl benzene, preferably 4%–8% divinyl benzene and having a mesh size between 20 and 100.

While it has been generally indicated above that the alkali metal ions, including ammonium ions, represent the type of ions which are innocuous in aqueous acidic hexavalent chromium-containing solutions, there are other innocuous ions which may be presented in certain chromating solutions such as barium in the case of chromating solutions for aluminum, zinc ions in the case of chromating solutions containing formates for chromating zinc surfaces. It will be appreciated that the method steps of this invention are broadly applicable to the modification of chromating solutions which require the presence of a metallic cation which is normally removed upon passage through a strongly acidic cation exchange resin bed, such as zinc ions in the case of zinc chromating solutions containing formates. By employing the procedure of regenerating the resin bed with a regenerating acidic solution contaiinng a proportion of the cation which is desirable in the operating chromating solution in a sufficient quantity to saturate the resin bed with that cation, the passage of the operating solution through the resin bed will not remove that desirable metallic ion from the operating solution passed through the resin bed and thus continuous operation will leave the operating chromating solution in an effective cation-balanced condition.

The most effective acidity of the aqueous hexavalent chromium-containing solution will vary with the particular metal which is being coated and such values are now generally well known to those skilled in the art. In general the pH can vary between 0.5 and 4.0 and as the acidity increases, the rate of metal attack increases. With the metals which are relatively easily attacked such as magnesium and zinc the higher pH values are preferred, whereas as the difficulty of metal attack increases the pH should be lower, for example in the range of 1–2 for aluminum chromating solutions. Moreover there is some permissible variation in the acidity increase, or hydrogen ion concentration, which can be tolerated by the operating chromating solution as the result of returning the effluent from the ion exchange resin bed thereto and the degree of tolerance of the operating solution varies somewhat with the metal surface which is being coated. For example, the degree of acidity variation which can occur in the case of an aluminum chromating solution is greater than can be tolerated in the case of a zinc chromating solution before adverse effects are encountered in the corrosion resistance of the resulting coating. In each case the preferred condition is to avoid any change in the acidity of the operating chromating solution as the result of the return of the effluent to that solution, but as a general guide it is satisfactory to control the pH of the effluent, relative to the pH of the operating chromating solution fed to the ion exchange resin bed within a small range of pH, for example, about plus or minus 0.5 pH. In every case the limiting condition is the control of the pH of the effluent from the ion exchange resin bed to a degree of acidity so close to that of the operating chromating solution that the coating-producing ability of the solution and the corrosion protective value of the resulting coating is not detrimentally affected.

In the operation of zinc chromating solutions it has been found to be desirable to continuously control the concentration of the trivalent chromium ions and the zinc ions in the solution. It was found that the gradual increase in the concentration of the zinc ions in a zinc chromating solution was harmful and the zinc ions could not be rendered innocuous by the addition of acid anions, such as nitrate, even at concentrations as high as 10–20 grams/liter of nitrate because such concentrations make the coating powdery and easily wiped off. For continuous operation of a zinc chromating solution the sum of the zinc ions and the trivalent chromium ions should be maintained below about 5 grams/liter and preferably below 2 grams/liter, for example in the range of .2 to 2 grams/liter.

The adverse effect of the increase in zinc ion concentration is illustrated in the following example. An aqueous solution was prepared to contain 2.5 g./l. $CrO_3$, 1.3 g./l. NaCl and 2.35 g./l. $NO_3$, as $HNO_3$, and sufficient water to make a liter. The bath was heated to a temperature in the range of 20° C.–22° C. and zinc sheets were immersed in the solution for 90 seconds and withdrawn until a total surface area of 4 sq. meters of zinc sheets was processed through the bath. During this processing the chromate content and the sodium chloride content were maintained constant by replenishing and sufficient nitric acid was added to offset the zinc ions freed during the processing. At the end of this processing the bath was analyzed and found to have the following composition: 2.45 g./l. $CrO_3$, 0.59 g./l. trivalent chromium ions, 1.32 g./l. NaCl, 9.3 g./l. $NO_3$ and 2.15 g./l. Zn. The first zinc sheets processed through the solution were covered with a dense light brown adherent coating, but after approximately 3 square meters had been processed through the bath the coating became noticeably lighter in color and did not have the denseness nor adherence of the earlier formed coatings.

A comparative bath prepared with the identical initial composition and under similar processing conditions of temperature, time and type of zinc sheets, 4 square meters of zinc surface area was processed through the bath. During this treatment, however, a small portion of the bath was continuously passed through a cation resin bed exchanger containing Dowex 50 resin and the effluent returned to the operating solution. Dowex 50 was loaded with H- and Na-ions. A solution of the following composition has been found suitable for regeneration:

112.5 g./l. $H_2SO_4$ (100%)
37.5 g./l. $NaHSO_4$

While regenerating, the cation exchange resin picks up, besides H-ions, sufficient of the sodium such that when the chromating solution is contacted with the exchange resin thus reconditioned, the pH of the effluent from said regenerated resin is substantially the same as the pH of said operating solution. During this processing the coatings maintained the appearance of the original panels of light brown colored coating which was dense and adherent. An analysis of the solution after 4 square meters of zinc sheets had been processed through the solution showed that the bath contained no free trivalent chromium ions or zinc ions and that the nitrate ions had not increased from their original concentration. During this processing the pH value remained substantially constant.

The chromating of magnesium and its alloys is appropriately done, for instance, with solutions containing about 150 g./l. $Na_2Cr_2O_7.2H_2O$ in water. Potassium or magnesium fluoride may still be added to that solution, according to the saturation concentration. The degreased sheets are treated by immersion at a bath temperature of about 95° C. for about 30 minutes. Magnesium-chromating baths on that base show the tendency of the pH increasing as the quantity of sheet processed therethrough increases, due to the magnesium ions passing into solution and the $CrO_3$ being reduced to trivalent chromium. Good dark-brown coatings are obtained if the pH is in the range of 3.5 to 5.2. When it increases above 5.2 coatings are considerably lighter in color and of mean appearance.

Now the bath of the above composition was, in accordance with the invention, passed continuously over Dowex 50, loaded with H- and Na-ions by prior contact with a solution containing 170 g./l. $NaHSO_4.H_2O$. When 4 square meters of "Dowmetal FS 1" sheet had been processed therethrough no noticeable increase of the pH value to the alkaline range was observed as yet. The exchange resin had substituted for the dissolved magnesium and the trivalent chromium an equivalent amount of H-ions. Continued processing of magnesium sheet resulted in some increase of the pH of the bath. Then the exchange resin was reconditioned with a solution containing 170 g./l. sodium bisulfate. Thus regenerated, it was contacted with the chromating bath and the initial optimum of the pH=3.6 was thereby restored. Chromic acid was replenished throughout processing such that the chromic acid level of the chromating bath was maintained constant.

For zinc chromating, solutions containing 5 g./l. $CrO_3$ and
5 g./l. HCl (100%)

are suitable among others. For these baths for instance Dowex 50 in mere H-form, that means regenerated with, say, sulfuric acid, may be used as ion exchange resin. In a bath of that composition zinc sheets, electrogalvanized iron sheets and zinc die castings were chromated by immersion for 10 to 15 seconds at 20 to 25° C. The resulting chromate coatings were brass-colored. The volumes used were 1 l. of the bath and 0.25 l. of the cation exchange resin. When processing the zinc parts, the solution was continuously cycled through the exchange resin at a rate of 3 l. per hour. When 6 square meters of zinc surface had been processed through, the cation exchange resin had loaded with zinc and trivalent chromium such that these cations began to increase in concentration also in the bath. At that time the exchange resin was reconditioned to its H-form with 15% sulfuric acid and after thorough water rinsing used again for regeneration of the chromating bath. The chromate coatings were perfect and uniform in color on all zinc parts processed through the bath.

What is claimed is:
1. A process for conditioning an ion exchange resin bed for use in conjunction with an aqueous acidic solution comprising hexavalent chromium ions for forming protective coatings on the surface of a metal selected from the group consisting of zinc, aluminum, cadmium, magnesium, iron, copper and alloys thereof which comprises the steps of (1) preliminarily conditioning a cation exchange resin to contain a proportion of hydrogen ions and metallic cations, which are innocuous to the metal coating-forming ability of the said chromating solution such that the pH of the said chromating solution fed through such resin is substantially the same as the pH of the effluent from said resin, (2) and periodically as said chromating solution is processed through said resin regenerating said resin with an aqueous acidic solution which contains sufficient of said innocuous cations such that the pH of the effluent from said regenerated resin is substantially the same as the pH of said chromate solution fed thereto.

2. A continuous process for forming a protective chromate coating on a metallic surface by contacting the metallic surface with an aqueous acidic solution comprising hexavalent chromium ions, which comprises the steps of (1) preliminarily conditioning a cation exchange resin to contain a proportion of hydrogen ions and metallic cations other than the cation of the metal to be coated which are innocuous to the metal coating-forming ability of the said chromating solution such that the pH of the said chromating solution fed through such resin is substantially the same as the pH of the effluent from said regenerating said resin with an aqueous acidic solution through the said resin as conditioned in step (1) and continuing said cycling of solution therethrough until the said resin is substantially exhausted, and (3) periodically regenerating said resin with an aqueous acidic solution which contains sufficient of said innocuous cations such that the pH of the effluent from said regenerated resin is substantially the same as the pH of said chromate solution fed thereto.

3. A process in accordance with claim 2 wherein said innocuous metallic cations are alkali metal ions.

4. In a process for continuously operating an aqueous acidic chromating solution suitable for forming protective coatings on the surfaces of metals selected from the group consisting of zinc, aluminum, cadmium, magnesium, iron, copper and alloys thereof in which a strong cation exchange resin bed is employed to remove metallic cations therefrom to thereby maintain the operating chromating solution in a substantailly steady cation-balanced condition, the improvement which comprises the step of periodically reconditioning the said resin bed with an aqueous acidic solution containing a controlled proportion of hydrogen ions and alkali metal ions such that the pH of the said chromating solution fed to said bed is substantially the same as the pH of the effluent obtained therefrom.

References Cited in the file of this patent
UNITED STATES PATENTS

| | | |
|---|---|---|
| 2,368,574 | Shoemaker | Jan. 30, 1945 |
| 2,376,914 | Gustafson | May 29, 1945 |
| 2,733,204 | Costa | Jan. 31, 1956 |
| 2,777,785 | Schuster et al. | Jan. 15, 1957 |
| 2,864,730 | Kinder et al. | Dec. 16, 1958 |

FOREIGN PATENTS

| | | |
|---|---|---|
| 730,897 | Great Britain | June 1, 1955 |

UNITED STATES PATENT OFFICE
CERTIFICATE OF CORRECTION

Patent No. 3,032,447             May 1, 1962

Werner Rausch

It is hereby certified that error appears in the above numbered patent requiring correction and that the said Letters Patent should read as corrected below.

Column 1, line 55, for "ion" read -- iron --; column 2, line 62, before "batch" insert -- or --; column 3, line 38, for "presented" read -- present --; column 6, line 30, for "regenerating said resin with an aqueous acidic" read -- resin, (2) passing a portion of said chromating --.

Signed and sealed this 28th day of May 1963.

(SEAL)
Attest:

ERNEST W. SWIDER
Attesting Officer

DAVID L. LADD
Commissioner of Patents